US005364909A

United States Patent [19]
Guo et al.

[11] Patent Number: 5,364,909
[45] Date of Patent: Nov. 15, 1994

[54] GRAFT POLYMER COMPOSITIONS CONTAINING MONO-AMINE FUNCTIONALIZED POLYOXYALKYLENE ETHERS

[75] Inventors: Shao H. Guo; Roger A. Grey, both of West Chester, Pa.

[73] Assignee: ARCO Chemical Technology, L.P., Wilmington, Del.

[21] Appl. No.: 106,492

[22] Filed: Aug. 11, 1993

Related U.S. Application Data

[63] Continuation of Ser. No. 919,654, Jul. 23, 1992, abandoned.

[51] Int. Cl.$^5$ .................... C08L 35/06; C08L 71/02
[52] U.S. Cl. ........................... 525/69; 525/187; 525/190
[58] Field of Search ............ 525/190, 69, 187

[56] References Cited

U.S. PATENT DOCUMENTS

| | | | |
|---|---|---|---|
| 3,654,370 | 4/1972 | Yeakey | 260/584 B |
| 3,840,499 | 10/1974 | DiGiulio | 260/78.5 T |
| 3,847,992 | 11/1974 | Moss | 260/584 B |
| 4,225,476 | 9/1980 | Hammer et al. | 260/27 R |
| 4,721,752 | 1/1988 | Schepers et al. | 525/74 |
| 4,742,116 | 3/1988 | Schepers et al. | 525/74 |
| 4,975,489 | 12/1990 | Kazmierzak | 525/142 |
| 5,055,527 | 10/1991 | Bronstert et al. | 525/207 |
| 5,118,761 | 6/1992 | Dharmarajan et al. | 525/210 |

Primary Examiner—James J. Seidleck
Assistant Examiner—I. Zemel
Attorney, Agent, or Firm—Stephen D. Harper

[57] ABSTRACT

Graft polymers are prepared by reacting thermoplastic copolymers comprised of alkenyl aromatic monomers and carboxylic acid moieties such as $\alpha,\beta$-unsaturated dicarboxylic acid anhydrides with mono-amine functionalized polyoxyalkylene ethers. The graft polymers are useful for the production of formed products such as injection molded articles and in blends or alloys with other thermoplastic resins such as polystyrene.

17 Claims, No Drawings

GRAFT POLYMER COMPOSITIONS CONTAINING MONO-AMINE FUNCTIONALIZED POLYOXYALKYLENE ETHERS

This is a continuation of application Ser. No. 07/919,654, filed Jul. 23, 1992.

FIELD OF THE INVENTION

This invention relates to thermoplastic resins containing $\alpha,\beta$-unsaturated carboxylic acid moieties which are modified by grafting with mono-amine functionalized polyoxyalkylene ethers.

BACKGROUND OF THE INVENTION

Styrenic resins having $\alpha,\beta$-unsaturated carboxylic acid moieties incorporated therein have long been known to be useful plastics for the production of molded articles having good heat resistance. However, these materials tend to be rather brittle, decreasing their utility in end-use applications wherein they will be subjected to repeated impact or flexing. A common solution to this problem is to incorporate a high molecular weight hydrocarbon-based rubber or elastomer such as a butadiene-containing polymer into the styrene resin so as to improve the toughness and impact properties. Although this approach works well and is practiced commercially on a large scale, it suffers from the disadvantage that the styrenic resin is typically rendered opaque (non-transparent) by the introduction of the rubber. In certain applications such as packaging, however, a non-brittle clear resin having good flexibility and resistance to cracking would be highly desirable. Currently available impact-modified styrene/carboxylic acid moiety copolymers are generally not suitable for such uses.

SUMMARY OF THE INVENTION

This invention provides a polymer composition comprising a thermoplastic copolymer comprised of polymerized units of an alkenyl aromatic monomer and an $\alpha,\beta$-unsaturated carboxylic acid moiety and an amount of a mono-amine functionalized polyoxyalkylene ether effective to improve the impact properties of the thermoplastic copolymer, wherein at least a portion of the mono-amine functionalized polyoxyalkylene ether is grafted onto the thermoplastic copolymer through amide linkages.

Also provided is a process for producing such a polymer composition comprising contacting a thermoplastic copolymer comprised of polymerized units of an alkenyl aromatic monomer and an $\alpha,\beta$-unsaturated carboxylic acid moiety with a mono-amine functionalized polyoxyalkylene ether for a time and at a temperature effective to react the amine functionality of the mono-amine functionalized polyoxyalkylene ether with the $\alpha,\beta$-unsaturated carboxylic acid moiety of the thermoplastic copolymer to form an amide linkage.

DETAILED DESCRIPTION OF THE INVENTION:

The thermoplastic copolymer component of the polymer composition of this invention is comprised of polymerized units of an alkenyl aromatic monomer and an $\alpha,\beta$-unsaturated carboxylic acid moiety. The alkenyl aromatic monomer may suitably be any compound containing an ethylenically unsaturated functional group attached directly to an aromatic radical. Such compounds correspond to the general formula

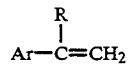

wherein Ar represents an aryl group such as phenyl or naphthyl and R is hydrogen or methyl. The aryl group may be substituted with one or more substituents such as alkoxy, aryl, carboxy, hydroxy, nitro, cyano, halogen and alkyl. Illustrative alkenyl aromatic monomers appropriate for use in the thermoplastic copolymer include styrene, alpha-methyl styrene, aromatic substituted (ortho-, meta-, or para-) methyl styrenes, ethyl styrenes, isopropyl styrenes, tert-butyl styrenes, chlorostyrenes, bromostyrenes, vinyl naphthalenes, acetoxystyrenes, methoxystyrenes, hydroxystyrenes, cyanostyrenes, vinyl xylenes, nitrostyrenes, benzyl styrenes, and the like and mixtures thereof. Styrene is preferred for use because of its low cost and high reactivity when copolymerized with $\alpha,\beta$-unsaturated carboxylic acid moieties.

The $\alpha,\beta$-unsaturated carboxylic acid moiety may be any ethylenically unsaturated organic compound which is copolymerizable with the alkenyl aromatic monomer and which contains a carboxylic functional group reactive with the amino group of the mono-amine functionalized polyoxyalkylene ether. The carboxylic functional group may be an acid, ester, imide, or, most preferably, anhydride. The $\alpha,\beta$-unsaturated carboxylic acid moiety is therefore most suitably either an $\alpha,\beta$unsaturated dicarboxylic acid anhydride, $\alpha,\beta$-unsaturated dicarboxylic diacid, $\alpha,\beta$-unsaturated monocarboxylic acid, $\alpha,\beta$-unsaturated dicarboxylic acid ester (mono- or di-), $\alpha,\beta$-unsaturated dicarboxylic acid imide, or the like. Different types of carboxylic acid moieties may be present.

The use of an $\alpha,\beta$-unsaturated dicarboxylic acid anhydride is preferred since the anhydride functionality may be readily reacted with the mono-amine functionalized polyoxyalkylene ether to form amide linkages. Comonomers of this type suitably have the following general structure prior to copolymerization

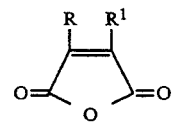

wherein R and $R^1$ are the same or different and are independently selected from hydrogen, halogen, $C_1$-$C_{10}$ alkyl, aryl alkyl (e.g., benzyl, phenethyl) and aryl. Examples of suitable $\alpha,\beta$-unsaturated dicarboxylic acid anhydrides include, but are not limited to, maleic anhydride (preferred), citraconic anhydride, ethyl maleic anhydride, methyl itaconic anhydride, dibromomaleic anhydride, itaconic anhydride, chloromaleic anhydrides, dichloromaleic anhydride, phenyl maleic anhydride, aconitic anhydride, and the like and mixtures thereof.

The $\alpha,\beta$-unsaturated carboxylic acid moiety may alternatively be an $\alpha,\beta$-unsaturated dicarboxylic diacid, diester, or half-acid, half-ester corresponding to the general structure

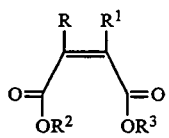

wherein R and $R^1$ are the same or different and are independently selected from hydrogen, halogen, $C_1$-$C_{10}$ alkyl, aryl alkyl and aryl. $R^2$ and $R^3$ are the same or different and are independently selected from hydrogen, $C_1$-$C_{10}$ alkyl, aryl alkyl, and aryl. Examples of suitable α,β-unsaturated dicarboxylic diacids include, but are not limited to, maleic acid, fumaric acid, itaconic acid, citraconic acid, mesaconic acid, ethyl maleic acid, methyl itaconic acid, chloromaleic acid, dichloromaleic acid, bromomaleic acid, dibromo maleic acid, phenyl maleic acid, and the like, and mixtures thereof. Methyl, ethyl, propyl, butyl, benzyl, or phenyl mono- or di-esters of these diacids or the like may also be used.

In another embodiment, an α,β-unsaturated monocarboxylic acid or ester may be utilized which preferably has the general structure

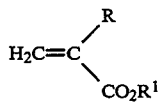

wherein R and $R^1$ are the same or different and are independently selected from hydrogen, $C_1$-$C_{10}$ alkyl, aryl alkyl, and aryl. Illustrative examples of comonomers of this type include but are not limited to, acrylic acid, methacrylic acid, methyl acrylate, methyl methacrylate, ethyl acrylate, ethyl methacrylate, butyl acrylate, 2-ethylhexyl acrylate, and the like and mixtures thereof.

The imide analogues of the α,β-unsaturated dicarboxylic acid anhydrides discussed hereinabove may also be employed as comonomers in the thermoplastic copolymer wherein the anhydride oxygen atom is replaced by NR. The R group may be hydrogen, alkyl (e.g., methyl, ethyl), aryl alkyl (e.g., benzyl, phenethyl) or aryl (e.g., phenyl).

In an especially preferred embodiment the thermoplastic copolymer is comprised of polymerized units of styrene and maleic anhydride.

The copolymer may additionally be comprised of polymerized units of other ethylenically unsaturated comonomers copolymerizable with the alkenyl aromatic monomer and the α,β-unsaturated carboxylic acid moiety. Unsaturated nitriles such as acrylonitrile and methacrylonitrile are especially appropriate for use as the additional comonomer.

The alkenyl aromatic monomer polymerized units preferably comprise more than 50 mole percent of the thermoplastic copolymer, with the α,β-unsaturated carboxylic acid moiety polymerized units comprising less than 50 mole percent. The copolymer, in a preferred embodiment, is comprised of from 70 to 97 weight percent alkenyl aromatic monomer polymerized units and from 3 to 30 weight percent α,β-unsaturated carboxylic acid moiety polymerized units. In general, increasing the relative proportion of the acid moiety will tend to increase the heat resistance of the final polymer composition and also enhance the ease with which the mono-amine functionalized polyoxyalkylene ether may be grafted onto the thermoplastic copolymer.

The composition of the thermoplastic copolymer should be selected such that it is a thermoplastic (i.e., a non-rubbery, relatively rigid substance that softens or melts when exposed to heat and returns to its original condition when cooled). In one embodiment of the invention, the thermoplastic copolymer has a glass transition temperature greater than 100° C. Copolymers having lower glass transition temperatures may also be utilized, however, depending upon the end use application. The thermoplastic copolymer desirably has a relatively high degree of polymerization, with the weight average molecular weight preferably being from about 15,000 to 5,000,000 (more preferably, from about 50,000 to 750,000).

If desired, the thermoplastic copolymer may be rubber-modified using any of the methods known in the art. Diene polymers are particularly appropriate for use as the rubber modifier, provided the polymer has a glass transition temperature less than 0° C. (more preferably, less than −20° C.). Suitable diene polymers include diene homopolymers (e.g., polybutadiene, polyisoprene) and block (linear, star, radial, tapered, graded) or random copolymers of a diene such as butadiene or isoprene and a comonomer selected from alkenyl aromatic monomers (e.g., styrene), unsaturated nitriles (e.g., acrylonitrile), α,β-unsaturated mono-caboxylic acid esters (e.g., methyl methacrylate, methylacrylate, butyl methacrylate, 2-ethylhexyl acrylate), α-olefins (e.g., ethylene, propylene, hexene), vinyl esters (e.g., vinyl acetate, vinyl stearate), vinyl ketones (e.g., vinyl methylketone, methyl isopropenyl ketone) and the like and mixtures thereof. Particularly preferred rubber modifiers include styrene/butadiene block and random copolymers, polybutadiene and EPM and EPDM rubbers. One surprising aspect of the present invention was the finding that rubber-modified thermoplastic copolymers of this type, which are ordinarily opaque due to the rubber modifier, are rendered transparent or nearly transparent by combining with the mono-amine functionalized polyoxyalkylene ether component of the invention.

Thermoplastic copolymers of the type described hereinabove are well-known in the art and may be prepared using conventional methods. For example, the copolymers may be obtained by solution copolymerization directly from the respective monomers by the incremental addition of the more reactive monomer as taught by U.S. Pat. No. 2,971,939 or by a continuous recycle polymerization process as described in U.S. Pat. Nos. 2,769,804 and 2,989,517. Alternatively, a suspension polymerization process such as is taught in U.S. Pat. No. 3,509,110 may be employed. Rubber-modified thermoplastic copolymers may be prepared by incorporation of the rubber into the monomer mixture prior to polymerization using, for example, the methods of U.S. Pat. Nos. 4,097,551 and 3,919,354. Suitable thermoplastic copolymers are also available commercially such as the "Dylark" styrene/maleic anhydride resins produced by ARCO Chemical Company, the "Stapron" styrene/maleic anhydride resins produced by DSM Engineering Plastics, the "Cadon" styrene terpolymer resins produced by Monsanto, and the "Ryulex" styrene/methacrylic acid resins produced by Daipippon Ink & Chemical.

The other necessary component of the polymer composition of this invention is a mono-amine functionalized polyoxyalkylene ether. "Mono-amine functionalized" in this context means that the compound contains one primary or secondary amine group. The function of the primary or secondary amine group is to react with the carboxylic group of the thermoplastic copolymer so as to form amide linkages. The polyoxyalkylene ether is thereby covalently grafted onto the thermoplastic copolymer. The use of polyamine functionalized polyoxyalkylene ethers is not desirable since such substances tend to induce cross-linking in the resulting polymer composition. Excessive cross-linking can interfere with melt processing of the compositions. The ether may, however, contain tertiary amine groups in addition to the one primary or secondary amine group since such tertiary amine groups will be non-reactive towards the thermoplastic copolymer.

The mono-amine functionalized polyoxyalkylene ether additionally contains at least two oxyalkylene segments formed by ring-opening polymerization or oligomerization of one or more epoxides or condensation of one or more glycols. In a preferred embodiment, the ether has the general structure segment is present, the resulting polyoxyalkylene ether may have either a block or random structure. The mono-amine functionalized polyoxyalkylene ether preferably has a number average molecular weight of from 300 to 5000 (more preferably, from 500 to 2100). The value of n is preferably in the range of from 2 to 80, but more preferably is from 8 to 45.

Mono-amine functionalized polyoxyalkylene ethers of the type described herein above are well-known in the art and may be prepared using conventional synthetic techniques. Suitable preparation methods are described, for example, in U.S. Pat. Nos. 4,618,717 (Renken et al.), 4,332,595 (Herbstman et al.), 4,181,682 (Watts et al.), 4,261,845 (Cuscurida), 4,107,096 (McEntire et al.), 3,847,992 (Moss), and 3,654,370 (Yeakey), and European Pat. Pub. Nos. 356,046 and 356,047, the teachings of which are incorporated herein by reference in their entirety. Mono-amine functional polyoxyalkylene ethers suitable for use in the compositions of this invention are available commercially, including certain of the "Jeffamine" ethers produced by Texaco Chemical. Illustrative commercial substances useful in this invention include, for example, the following:

| Mono-amine Functionalized Polyoxyalkylene Ether | R | Molecular Weight | Propylene Oxide/Ethylene Oxide Molar Ratio |
|---|---|---|---|
| "Jeffamine M-300" | n-C$_{10-16}$ | 300 | 2/0 |
| "Jeffamine M-360" | n-butyl | 360 | 2/4 |
| "Jeffamine M-600" | methyl | 600 | 9/1 |
| "Jeffamine M-715" | methyl | 700 | 2/13 |
| "Jeffamine M-1000" | methyl | 1000 | 3/19 |
| "Jeffamine M-2005" | methyl | 2000 | 32/3 |
| "Jeffamine M-2070" | methyl | 2000 | 10/32 |

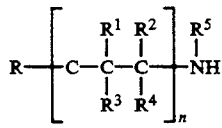

wherein R is hydrogen or a hydrocarbyl radical, $R^1$, $R^2$, $R^3$, $R^4$, and $R^5$ are the same or different and are independently selected from hydrogen, alkyl, aryl and aryl alkyl, and n is 2 to 80. The various R groups may be substituted with various groups which are non-reactive towards the thermoplastic copolymer (e.g., halogen, cyano, nitro, alkoxyl, hydroxy, carboxy, and the like). Especially preferred mono-amine functionalized polyoxyalkylene ethers include those wherein R is $C_1$–$C_{22}$ alkyl (linear, branched, or cyclic such as methyl, ethyl, n-propyl, isopropyl, n-butyl, sec-butyl, iso-butyl, tert-butyl, cyclohexyl, n-hexyl, 2-ethyl hexyl, dodecyl, and the like), $C_6$–$C_{20}$ aryl (substituted or unsubstituted, including, for example, phenyl, naphthyl, tolyl, mesityl, halophenyl, nitrophenyl, methoxyphenyl, nonyl phenyl, xylyl, cumenyl, and the like), or $C_7$–$C_{20}$ aryl alkyl (substituted or unsubstituted, including, for example, benzyl, phenethyl, and the like), $R^1$, $R^2$, and $R^3$ are hydrogen and $R^4$ is hydrogen, methyl, or ethyl. The oxyalkylene segments are preferably oxyethylene, oxypropylene, oxybutylene, or some combination thereof, but may be derived from any epoxide such as ethylene oxide, propylene oxide, n-butene oxide, isobutylene oxide, 2-butene oxide, cyclohexene oxide, cyclooctene oxide, phenyl glycidyl ether, styrene oxide, allyl glycidyl ether, methyl glycidyl ether, ethyl glycidyl ether, 1-octene oxide, epichlorohydrin, and the like and mixtures thereof. If more than one type of oxyalkylene Sufficient mono-amine functionalized polyoxyalkylene ether is combined with the thermoplastic copolymer to obtain the desired improvement in physical, mechanical, or optical properties of the thermoplastic copolymer. In particular, the amount of mono-amine functionalized polyoxyalkylene ether relative to the amount of thermoplastic copolymer is selected such that an improvement (i.e., an increase) in the impact properties of the thermoplastic copolymer is realized. Impact properties may be quantitatively measured by well-known test methods such as notched Izod impact or falling weight impact. Preferably, the amount of ether utilized is adjusted such that at least a 10% increase in notched Izod impact is obtained. The precise minimum amount required to produce a significant enhancement of such properties will, of course, vary depending upon the chemical compositions, structures, and molecular weights of the components employed as well as the extent of grafting achieved. Such amount may be readily determined, however, by simply increasing the quantity of ether used relative to thermoplastic copolymer until the desired improvement is observed. In general, however, it will be advantageous to use more than 25 parts by weight of the mono-amine functionalized polyoxyalkylene ether for every 100 parts by weight of the thermoplastic copolymer. Preferably, at least 35 parts by weight of the ether is utilized. The graft polymer composition may comprise from 35 to 100 parts by weight functionalized polyoxyalkylene ether per 100 parts by weight of the thermoplastic copolymer.

The polymer compositions of this invention may be blended, admixed, or combined with other thermoplastic resins with or without the addition of compatibilizers to obtain blends or alloys having improved properties or performance characteristics. For example, the polymer composition when blended with a styrenic polymer such as polystyrene has the beneficial effect of increasing the impact strength of the styrenic polymer. The relative proportion of styrenic polymer:graft polymer composition may be varied as desired, preferably from 99:1 to 1:2 on a weight basis. Multi-layer laminates or coextruded films containing the instant polymer compositions and other thermoplastic resins may also be prepared if desired. Illustrative examples of other thermoplastic resins suitable for blending, alloying, coextruding, or laminating with the polymer compositions of the invention include, but are not limited to, polyethylene, polypropylene, polyethylene terephthalate, polybutylene terephthalate, polyvinyl chloride, polyphenylene oxide, polyamides, SAN resins, ABS resins, MBS resins, polycarbonate, polyurethanes, polymethyl methacrylate and other acrylic resins, polyesters, and the like.

The polymer compositions of this invention may additionally contain any of the standard thermoplastic additives known in the art such as fillers, reinforcing agents, colorants, lubricants, processing aids, anti-static agents, stabilizers, fire retardants, anti-oxidants, anti-blocking agents, and/or other compounding ingredients. Such additives may be added to the final polymer composition or introduced by premixing with any or all of the individual components, for example.

Examples of fillers which may be blended with the polymer compositions of this invention include, but are not limited to, mineral fillers such as calcium carbonate, dolomite, silicates, silicas, talc, koalin, mica, magnesium phosphate, barium sulfate, titanium oxide, and the like, organic fillers such as carbon black, and fibrous fillers such as glass fiber (including strands and chopped fiber), carbon fiber, graphite fiber, synthetic thermoplastic fiber (e.g., aliphatic polyamide, aromatic polyamide, polyethylene, polypropylene), ceramic fiber, and boron fiber. The weight ratio of polymer composition to filler is preferably from about 0.5:1 to 20:1.

The method by which the thermoplastic copolymer and mono-amine functionalized polyoxyalkylene ether components of the polymer composition are combined is not critical provided that at least a portion of the mono-amine functionalized polyoxyalkylene ether is grafted onto the thermoplastic copolymer. The grafting is believed to occur by reaction of amine groups with the carboxylic groups so as to form amide linkages. For example, when the $\alpha,\beta$-unsaturated carboxylic acid moiety in the thermoplastic copolymer is an anhydride, the mono-amine functionalized polyoxyalkylene ether reacts to form a half-amide, half-acid as follows:

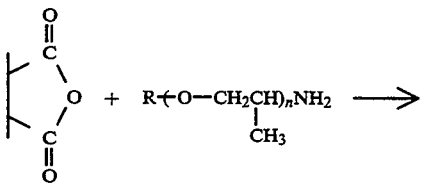

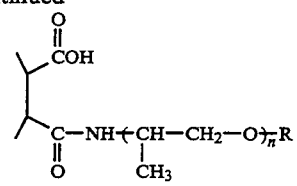

Although the half-amide, half-acid could possibly be converted into an imide by dehydration, imidization is not necessary in order to obtain satisfactory properties and performance in the polymer composition.

The conditions necessary to achieve at least partial grafting of the components of the polymer composition will vary depending upon the reactivities of the individual components. When the thermoplastic copolymer contains anhydride groups, for example, the desired grafting reaction will generally take place rapidly at relatively low temperature since the anhydride ring is opened rather easily by the amine. If the thermoplastic copolymer contains acid, imide, or ester groups, however, more vigorous reaction conditions may be necessary. The rate of amidation may be increased in such instances by the use of an appropriate catalyst, higher reaction temperatures, or by removing any volatile coproducts which may be generated so as to drive the amidation in the desired direction. Where the carboxylic group in the thermoplastic copolymer is a carboxylic acid, for example, it will be helpful to combine the components under vacuum in order to remove the water formed during amidation. Likewise, if the thermoplastic copolymer contains carboxylic ester groups, the rate of grafting can be improved by separating the alcohol coproduct formed from the graft polymer composition. In general, temperatures of from about $-10°$ C. to $300°$ C. will be appropriate for use in preparing the graft polymer compositions.

The polymer compositions may be obtained by allowing the components to react in solution using a solvent or mixture of solvents capable of dissolving the components (suitable solvents include, but are not limited to, ethers such as tetrahydrofuran, aromatic hydrocarbons such as toluene, and halogenated hydrocarbons such as methylene chloride) or in the melt phase above the melting or softening point of the thermoplastic copolymer (for example, in a reactive extrusion process).

Any of the known thermoplastic forming techniques may be used to shape the polymer compositions of this invention into final products. These techniques include, but are not limited to, injection molding, extrusion (including coextrusion) thermoforming, stamping, structural foam molding, expandable bead foam molding, extrusion blow molding, injection blow molding, rotational molding, fiber spinning, pultrusion, film casting or extrusion, lamination, and the like. The instant polymer compositions also have possible utility as polymer blend compatibilizers, antistatic additives or processing aids for thermoplastics, dye carriers, barrier resins, and so forth.

From the foregoing description, one skilled in the art can readily ascertain the essential characteristics of this invention, and, without departing from the spirit and scope thereof, can make various changes and modifications of the invention to adapt it to various usages, conditions, and embodiments.

The following examples further illustrate the polymer compositions of this invention, but are not limitative of the invention in any manner whatsoever.

EXAMPLE 1

This example demonstrates the use of a mono-amine functionalized polyoxyalkylene ether and a styrene/maleic anhydride copolymer in the preparation of a polymer composition in accordance with the invention.

"Dylark250" resin (210 g; a rubber-modified styrene/maleic anhydride copolymer containing about 8 weight percent maleic anhydride produced by ARCO Chemical) was dissolved in tetrahydrofuran (1L) at 25° C. To this solution was added "Jeffamine M-2005"(90 g; a 2000 molecular weight primary amine-functionalized polyoxyethylene/propylene methyl ether produced by Texaco Chemical) and butylated hydroxytoluene (0.6g). After mixing thoroughly, the resulting solution was poured into a shallow tray and the solvent largely removed by evaporation. The polymer composition thus produced was frozen on dry ice, then chipped out of the tray and ground into a powder. Infrared analysis of the polymer composition obtained after drying to constant weight in an 80° C. vacuum oven indicated that the anhydride functionality of the styrene/maleic anhydride copolymer had reacted with the mono-amine functionalized polyoxyalkylene ether to form a grafted system containing half-acid, half-amide functionalities. The composition had a glass transition temperature of 84° C. (as compared to the 123° C. Tg of the initial "Dylark250" resin). The onset of decomposition as measured by thermogravimetric analysis was found to be 399.7° C., which was surprisingly high in view of the large amount of polyoxyalkylene ether employed and the known propensity of polyoxyalkylene compounds to exhibit oxidative and thermal degradition at temperatures above 200° C. The polymer composition was injection molded at 350° F. into testing specimens. The following physical and mechanical properties were measured.

| | |
|---|---|
| Elongation at break: | 293.2% |
| Stress at break: | 4800 psi |
| Falling weight impact: | 9.2 in.-lb. |
| Transparency (0.017 in. thickness): | 50% (as compared to only 0.5% in "Dylark 250" resin) |

EXAMPLE 2

The procedure of Example 1 was repeated, but using 500 g of "Dylark 232" resin (a styrene/maleic anhydride copolymer produced by ARCO Chemical) instead of "Dylark250" resin, 2 L of tetrahydrofuran, 256 g of "Jeffamine M-715"(a mono-amine functionalized polyoxyalkylene methyl ether containing 2 equivalents propylene oxide and 13 equivalents ethylene oxide produced by Texaco Chemical) instead of "Jeffamine M-2005", and 1.0 g of BHT. The glass transition temperature of the grafted polymer composition thus formed, which by infrared analysis was determined to contain half-acid, half-amide functional groups, was 35.6° C.

The polymer composition (400 g) was subsequently blended with polystyrene (600 g) in an extruder and the resulting blend molded into test specimens using an injection mold. The blend exhibited the following properties:

| | Blend | Polystyrene |
|---|---|---|
| Elongation at break, %: | 10.4 | 1.8 |
| Stress at break, psi: | 4282 | 5200 |
| Falling weight impact, in.-lb. | 0.40 | 0.26 |
| Tg, °C.: | 38.8; 100 | 100 |

EXAMPLES 3-4

To demonstrate the effect of varying the relative proportions of thermoplastic copolymer and mono-amine functionalized polyoxyalkylene ether, the procedure of Example 1 was repeated using either 80 parts by weight of "Dylark250" resin and 20 parts by weight "Jeffamine M-2005"(Example 3) or 90 parts by weight of "Dylark250" resin and 10 parts by weight "Jeffamine M-2005"(Example 4). In each instance, the polymer composition obtained was opaque (non-transparent).

EXAMPLE 5

To demonstrate the importance of using only mono-amine functionalized polyoxyalkylene ether in the compositions of this invention, the procedure of Example 1 was repeated using a mixture of 20 parts by weight "Jeffamine M-2005" and 10 parts by weight "Jeffamine D-2000"(a di-amine functionalized polyoxypropylene having a molecular weight of ca. 2000 available from Texaco Chemical) in place of the 30 parts by weight "Jeffamine M-2005." The resulting polymer composition was not processable by either compression molding or extrusion, apparently due to the crosslinking induced by the "Jeffamine D-2000."

EXAMPLE 6

To show the criticality of using an amine-functionalized polyoxyalkylene ether, the procedure of Example 1 was repeated using 30 parts by weight "ARCOL R-1820"(a mono-hydroxy functionalized polyoxypropylene having a molecular weight of ca. 2000 available from ARCO Chemical Company) in place of the 30 parts by weight "Jeffamine M-2005. " The resulting polymer composition was brittle and opaque.

EXAMPLE 7

The graft polymer composition prepared in Example 1 (30 parts by weight) was blended with polystyrene in an extruder. The resulting blend was injection-molded into test specimens, which exhibited the following properties.

| | Blend | Polystyrene |
|---|---|---|
| Elongation at break. % | 11.9 | 1.8 |
| Stress at break, psi | 3500 | 5200 |
| D256A, Izod notched impact, ft.-lb., ⅛ in. specimen | 0.46 | 0.26 |
| Tg, °C. | 99.1 | 99.5 |
| DTUL, °F., 264 psi | 164 | 170 |

EXAMPLE 8

A 20% solution of "Dylark 232" resin (a styrene/maleic anhydride copolymer containing about 8 weight % maleic anhydride available from ARCO Chemical Company) in tetrahydrofuran containing 70 parts by weight of the resin was prepared at room temperature with agitation. "Jeffamine M-715" (30 parts) and BHT (0.15 parts) were added to the solution. The graft polymer formed was isolated using the procedure described in Example 1 and injection molded into test specimens. The graft polymer was found to contain both amide and acid functionalities by infrared spectroscopy. The following properties of the injection molded specimens were measured:

| | |
|---|---|
| Elongation at break, % | 157.8 |
| Stress at break, psi | 991 |
| Tg, °C. | 35.6 |
| Transparency (0.017 mm thickness), % | 78 |

EXAMPLES 9-10

The procedure of Example 8 was repeated using either 80 parts "Dylark 232" resin and 20 parts "Jeffamine M-715"(Example 9) or 90 parts "Dylark 232" resin and 10 parts "Jeffamine M-715" (Example 10). The cast films of the resulting polymers were still brittle, demonstrating the desirability of using a relatively high proportion of mono-mine functionalized polyoxyalkylene ether.

EXAMPLE 11

To demonstrate the criticality of employing a monoamine functionalized polyoxyalkylene ether in the compositions of the invention, the procedure of Example 8 was repeated using octadecyl amine (30 parts) instead of "Jeffamine M-715." The cast film of the resulting polymer was brittle.

EXAMPLES 12-14

The procedure of Example 8 was repeated, with "Dylark 378" resin (a rubber-modified styrene/maleic anhydride copolymer containing about 12 weight percent maleic anhydride available from ARCO Chemical Company) being substituted for "Dylark 232" resin and with "Jeffamine M-2005" being substituted for "Jeffamine M-715". Example 13 employed 80 parts by weight "Dylark 378" resin while Example 14 employed 70 parts by weight "Dylark 378" resin. A significant improvement in the falling weight impact properties of the "Dylark 378" resin was observed when combined with 30 parts by weight "Jeffamine M-2005."

| Example No. | "Jeffamine M-2005"/"Dylark 378" wt/wt | Falling Wt. Impact, in.-lb. |
|---|---|---|
| 12 | 0/100 | 1.63 |
| 13 | 20/80 | 0.26 |
| 14 | 30/70 | 9.24 |

We claim:
1. A polymer blend comprised of
   (a) polystyrene; and
   (b) a graft polymer composition consisting essentially of
      (i) 100 parts by weight of a thermoplastic copolymer comprised of polymerized units of an alkenyl aromatic monomer and an α, β-unsaturated carboxylic acid moiety; and
      (ii) from 25 to 100 parts by weight of a monoamine functionalized polyoxyalkylene ether, wherein at least a portion of the mono-amine functionalized polyoxyalkylene ether is grafted onto the thermoplastic copolymer through amide linkages.

2. The polymer blend of claim 1 wherein the relative proportion of polystyrene to graft polymer composition is from 99:1 to 1:2 on a weight basis.
3. The polymer blend of claim 1 wherein the alkenyl aromatic monomer is styrene.
4. The polymer blend of claim 1 wherein the α, β-unsaturated carboxylic acid moiety is an α, β-unsaturated dicarboxylic acid anhydride.
5. The polymer blend of claim 4 wherein the α, β-unsaturated dicarboxylic acid anhydride is maleic anhydride.
6. The polymer blend of claim 1 wherein the thermoplastic copolymer is comprised of from 70 to 97 weight percent of alkenyl aromatic monomer polymerized units and from 3 to 30 weight percent of α, β-unsaturated carboxylic acid moiety polymerized units.
7. The polymer blend of claim 1 wherein the monoamine functionalized polyoxyalkylene ether has the following structure

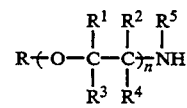

wherein R is hydrogen or a hydrocarbyl radical, $R^1$, $R^2$, $R^3$, $R^4$, and $R^5$ are the same or different and are independently selected from hydrogen, alkyl, aryl, and aryl alkyl, and n is 2 to 80.

8. The polymer blend of claim 7 wherein R is $C_1$-$C_{22}$ alkyl, $C_6$-$C_{20}$ aryl, or $C_7$-$C_{20}$ aryl alkyl, $R^1$, $R^2$, and $R^3$ are hydrogen, and $R^4$ is hydrogen, methyl, or ethyl.
9. The polymer blend of claim 7 wherein $R^1$, $R^2$, and $R^3$ are hydrogen and $R^4$ is hydrogen or methyl.
10. The polymer blend of claim 1 wherein the thermoplastic copolymer is rubber-modified.
11. The polymer blend of claim 10 wherein the thermoplastic copolymer is rubber-modified with a diene polymer having a glass transition temperature less than 0° C.
12. The polymer blend of claim 1 wherein the monoamine functionalized polyoxyalkylene ether has a number average molecular weight of from 300 to 5000.
13. A polymer blend comprised of
   (a) polystyrene; and
   (b) a graft polymer composition consisting essentially of
      (i) 100 pads by weight of a thermoplastic copolymer comprised of polymerized units of styrene and maleic anhydride; and
      (ii) from b 35 1 to 100 pads by weight of a monoamine functionalized polyoxyalkylene ether having the following structure

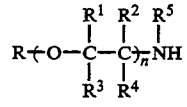

wherein R is hydrogen, $C_1$-$C_{22}$ alkyl, $C_6$-$C_{20}$ aryl, or $C_7$-$C_{20}$ aryl alkyl, $R^1$, $R^2$, and $R^3$ are hydrogen, and $R^4$ is hydrogen, methyl, or ethyl, $R^5$ is hydrogen, $C_1$-$C_{22}$ alkyl, $C_6$-$C_{20}$ aryl, or $C_7$-$C_{20}$ aryl alkyl, and n is 8 to 45, wherein at least a portion of the mono-amine functionalized polyoxyalkylene ether is grafted onto the thermoplastic copolymer through amide linkages.

14. The polymer blend of claim 13 wherein $R^5$ is hydrogen.

15. The polymer blend of claim 13 wherein the thermoplastic copolymer is comprised of from 70 to 97 weight percent styrene polymerized units and from 3 to 30 weight percent maleic anhydride polymerized units.

16. The polymer blend of claim 13 wherein the thermoplastic copolymer is rubber-modified with a diene polymer having a glass transition temperature less than 0° C.

17. The polymer blend of claim 16 wherein the diene polymer is selected from diene homopolymers and block or random copolymers of a diene and a comonomer selected from alkenyl aromatic monomers, unsaturated nitriles, $\alpha$, $\beta$-unsaturated mono-carboxylic acid esters, $\alpha$-olefins, vinyl ketones, vinyl esters, and mixtures thereof.

* * * * *